(12) United States Patent
Li et al.

(10) Patent No.: US 7,194,264 B2
(45) Date of Patent: Mar. 20, 2007

(54) SYSTEM SELECTION AND ACQUISITION FOR A WIRELESS DEVICE

(75) Inventors: Yan Li, Beijing (CN); Chidambaram Krishnan, San Diego, CA (US); James A. Hutchison, San Diego, CA (US); Rotem Cooper, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 76 days.

(21) Appl. No.: 11/043,359

(22) Filed: Jan. 25, 2005

(65) Prior Publication Data

US 2005/0227688 A1 Oct. 13, 2005

Related U.S. Application Data

(60) Provisional application No. 60/561,019, filed on Apr. 9, 2004.

(51) Int. Cl.
*H04Q 7/20* (2006.01)

(52) U.S. Cl. ................ 455/432.1; 455/432.2; 455/432.3; 455/552.1

(58) Field of Classification Search ........... 455/419, 455/432.1–432.2, 436, 552.1, 553.1
See application file for complete search history.

(56) References Cited

U.S. PATENT DOCUMENTS 6,185,436 B1 * 2/2001 Vu ..................... 455/558
6,493,549 B1 * 12/2002 Axelson et al. ............. 455/419
6,564,055 B1 * 5/2003 Hronek ................... 455/433
6,625,451 B1 * 9/2003 La Medica et al. ......... 455/434
6,993,336 B2 * 1/2006 Aerrabotu et al. .......... 455/437
2002/0193112 A1 * 12/2002 Aoki et al. ................. 455/437
2004/0087305 A1 * 5/2004 Jiang et al. ............ 455/432.1
2004/0233862 A1 * 11/2004 Huang et al. ............... 370/320
2005/0060699 A1 * 3/2005 Kim et al. .................. 717/168

* cited by examiner

*Primary Examiner*—Joseph Feild
*Assistant Examiner*—Jaime Holliday
(74) *Attorney, Agent, or Firm*—Thomas Rouse; Charles D. Brown; Kenyon Jenckes

(57) ABSTRACT

Wireless devices with different capabilities may use a single file containing multiple (e.g., two) PRLs for system selection and acquisition. A first PRL in the file has a first (e.g., IS-683-A) format and includes PRL information for, e.g., 1x systems. A second PRL has a second (e.g., IS-683-C) format and includes PRL information for, e.g., 1x and 1xEV-DO systems or just 1xEV-DO systems. A legacy wireless device supporting only IS-683-A would read and use the first PRL for system selection and acquisition and ignore the second PRL. A wireless device supporting IS-683-C would read the second PRL and (1) use the second PRL by itself if it contains PRL information for both 1x and 1xEV-DO systems or (2) combine the first and second PRLs to generate a combined PRL if the second PRL contains PRL information for only 1xEV-DO systems.

17 Claims, 11 Drawing Sheets

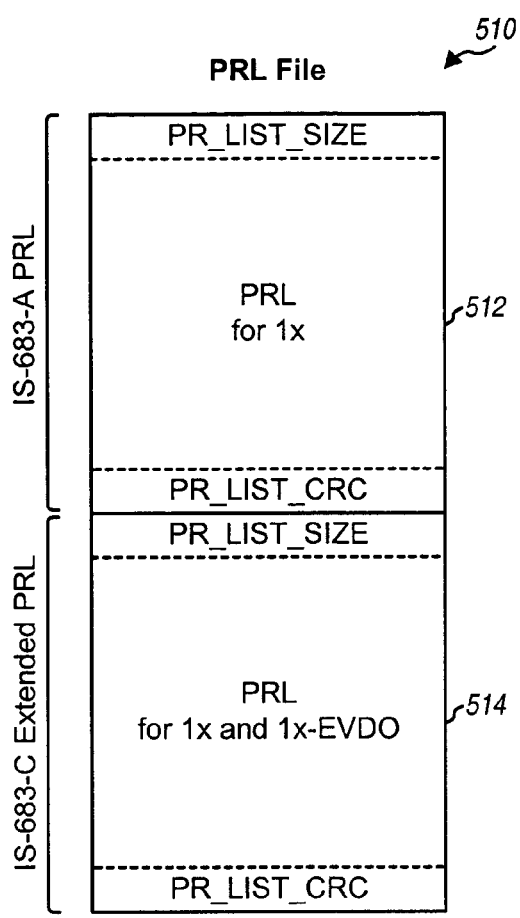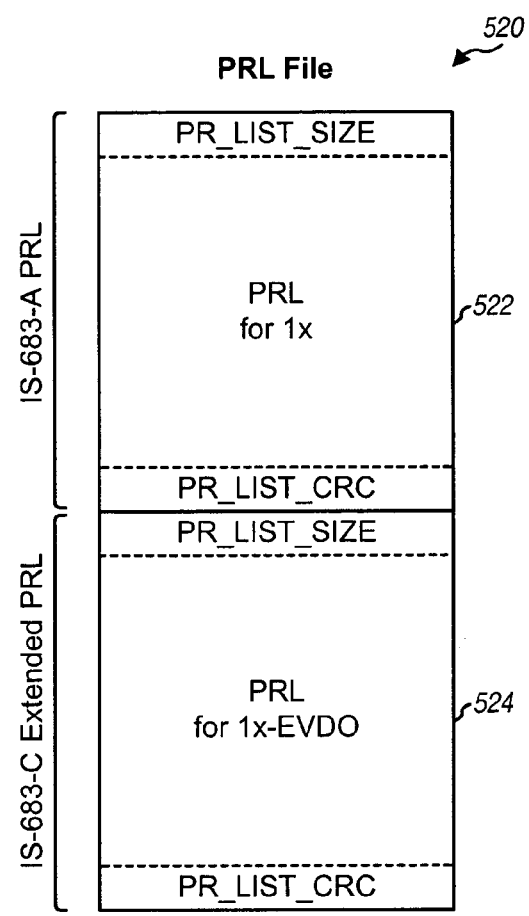
*FIG. 5A*  *FIG. 5B*

$EF_{PRL}$

| Identifier: '6F30' | Structure: transparent | Mandatory |
|---|---|---|
| File size: "PRL File Size" | Update activity: low | |
| Access Conditions:<br>    READ           CHV<br>    UPDATE       ADM<br>    INVALIDATE  ADM<br>    REHABILITATE ADM ||||

| Bytes | Description | M/O | Length |
|---|---|---|---|
| 1 - PRL File Size | PR_LIST | O | PRL File Size |

SYSTEM SELECTION AND ACQUISITION FOR A WIRELESS DEVICE

This application claims the benefit of provisional U.S. Provisional Application Ser. No. 60/561,019, entitled "SIM Based Extended Service Acquisition," filed Apr. 9, 2004.

BACKGROUND

I. Field

The present invention relates generally to communication, and more specifically to techniques for performing system selection and acquisition by a wireless device.

II. Background

Wireless communication systems are widely deployed to provide various communication services such as voice, packet data, and so on. These systems may be multiple-access systems capable of supporting communication with multiple users by sharing the available system resources. Examples of such multiple-access systems include Code Division Multiple Access (CDMA) systems, Time Division Multiple Access (TDMA) systems, and Frequency Division Multiple Access (FDMA) systems. A CDMA system may implement a radio access technology (RAT) such as cdma2000 or Wideband-CDMA (W-CDMA). cdma2000 covers the well-known IS-2000, IS-856, and IS-95 standards.

IS-2000 and IS-95 support both voice and data services and are commonly referred to as "1x-EV-DV", or simply "1x", where the DV stands for "data and voice". A wireless device (e.g., a cellular phone) supporting 1x typically maintains a preferred roaming list (PRL). This PRL contains information to assist the wireless device perform system selection and acquisition on 1x systems, particularly when the wireless device is roaming. The PRL identifies "permitted" systems that the wireless device should use and (optionally) "forbidden" systems that the wireless device should not use. The PRL format for 1x systems is described in a document TIA/EIA/IS-683-A, entitled "Over-the-Air Service Provisioning of Mobile Stations in Spread Spectrum Standards," June 1998, which is publicly available.

IS-856 supports packet data service and is commonly referred to as "1xEV-DO", where the DO stands for "data optimized". A wireless device supporting 1xEV-DO also maintains a PRL for system selection and acquisition on 1xEV-DO systems. The PRL format for 1xEV-DO is described in a document TIA/EIA/IS-683-C, entitled "Over-the-Air Service Provisioning of Mobile Stations in Spread Spectrum Standards," Oct. 25, 2002, which is also publicly available. IS-683-C describes (1) a PRL format that is an updated version of the PRL format defined by IS-683-A and that may be used for 1x systems and (2) an extended PRL format that may be used for both 1x and 1xEV-DO systems.

The PRL format defined by IS-683-A is different from the extended PRL format defined by IS-683-C. The different PRL formats cause problems for both "legacy" wireless devices that support IS-683-A and "new" wireless devices that support IS-683-C. A legacy wireless device is not able to recognize the extended PRL format and would not be able to perform system selection and acquisition if presented with an extended PRL. The legacy wireless device would then experience loss of service due to incompatible PRL formats. A new wireless device can recognize and use a PRL in the IS-683-A format. However, since the IS-683-A PRL format does not support 1xEV-DO, the new wireless device would not be able to acquire and receive services from 1xEV-DO systems. The new wireless device would then experience service limitation and limited ability to upgrade service information due to the limitations of the IS-683-A PRL. Both of the problems described above are highly undesirable.

There is therefore a need in the art for techniques to support system selection and acquisition for both legacy and new wireless devices.

SUMMARY

Techniques to support system selection and acquisition for wireless devices with different capabilities are described herein. In one embodiment, a single file containing a first PRL followed by a second PRL is used for both legacy and new wireless devices. The first PRL has a first PRL format (e.g., an IS-683-A compatible format) and may include system selection and acquisition information (or simply, PRL information) for 1x systems. The second PRL has a second PRL format (e.g., an IS-683-C compatible format) and may include PRL information for both 1x and 1xEV-DO systems or just 1xEV-DO systems.

A legacy wireless device that is provided with this file would read the first PRL based on a PR_LIST_SIZE field for this PRL, check to see if the first PRL is valid based on a cyclic redundancy check (CRC) value included in this PRL, and use the first PRL for system selection and acquisition if it is valid. The legacy wireless device would ignore the remaining data in the file.

A new wireless device that is provided with the same file would use the PR_LIST_SIZE field for the first PRL to locate the second PRL. The new wireless device would read the second PRL based on the PR_LIST_SIZE field for this PRL and check to see if the second PRL is valid based on a CRC value included in this PRL. If the second PRL contains PRL information for both 1x and 1xEV-DO systems, then the new wireless device would use the second PRL for system selection and acquisition and would ignore the first PRL. If the second PRL contains PRL information for only 1xEV-DO systems, then the new wireless device would combine the first and second PRLs to generate a combined PRL, and would then use the combined PRL for system selection and acquisition. In other embodiments, a single file may contain a PRL followed by one or more sections with additional PRL information that may be used by wireless devices with different capabilities.

The PRL file described herein may be stored in a removable module that may be inserted in, and used for, a variety of wireless devices with different capabilities. The PRL file may also be sent over-the-air and downloaded onto wireless devices, stored in removable modules, and so on. Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIGS. 5A through 5F show six embodiments of a PRL file having a structure that can support wireless devices with different capabilities;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
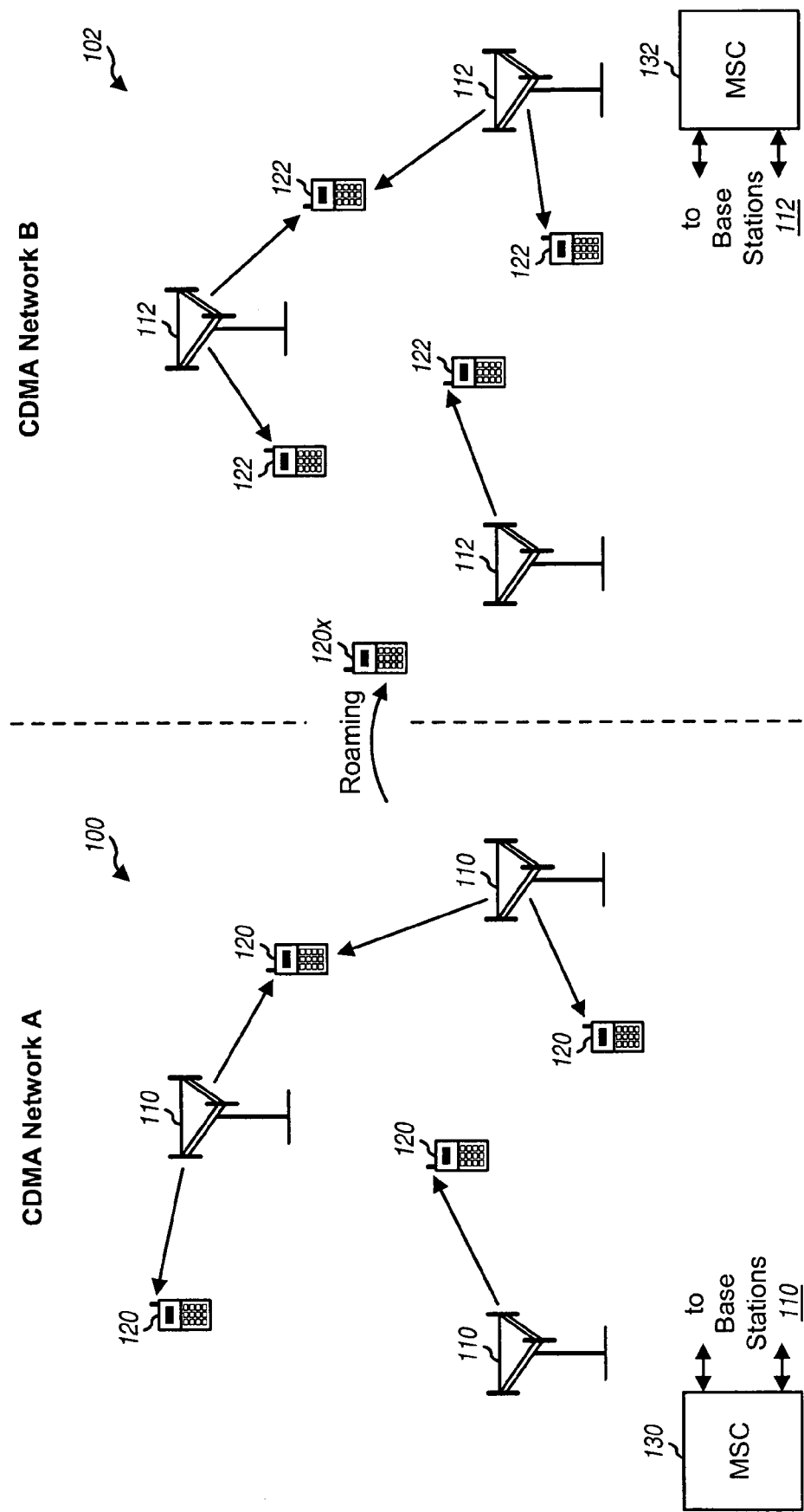
FIG. 1 shows two CDMA networks.

FIG. 1 shows two CDMA networks 100 and 102 that may be deployed in the same or different geographic regions. Each CDMA network may be a 1x network, a 1xEV-DO network, or some other types of network. Each CDMA network includes one or more systems, and each system further includes one or more smaller networks. Each system of a 1x network is identified by a system identification (SID) value, and each smaller network of each 1x system is identified by a network identification (NID) value. The systems and networks in 1xEV-DO are identified using a subnet-ID, which may be up to 128 bit long and follow IPv6 representation format as described in RFC2460, entitled "Internet Protocol, Version 6 (IPv6) Specification," December 1998. CDMA networks 100 and 102 typically include many base stations 110 and 112, respectively, that support communication for wireless devices 120 and 122, respectively, within the coverage areas of these CDMA networks. For simplicity, only three base stations are shown in FIG. 1 for each CDMA network. A base station (1x terminology) is a fixed station and may also be called a base transceiver station (BTS), an access point (1xEV-DO terminology), a Node B (W-CDMA terminology), or some other terminology. Wireless devices 120 and 122 are located throughout the coverage areas of CDMA networks 100 and 102, respectively. A wireless device may also be called a mobile station (1x terminology), a user/access terminal or AT/HAT (1xEV-DO terminology), a user equipment (UE) (W-CDMA terminology), a mobile equipment (ME) (also W-CDMA terminology), a handset, a subscriber unit, or some other terminology. Mobile switching centers (MSCs) 130 and 132 provide coordination and control for base stations in CDMA networks 100 and 102, respectively.

For 1x and 1xEV-DO, a wireless device maintains a preferred roaming list (PRL) for system selection and acquisition. The wireless device may be programmed with the PRL via a serial interface, a Universal Serial Bus (USB) interface, or some other type of interface, e.g., during manufacturing or activation. The wireless device may also obtain the PRL via over-the-air signaling or from a Removable User Identity Module (R-UIM), which is a removable module that can be inserted into the wireless device. In any case, the wireless device stores the PRL in a non-volatile memory so that the PRL is retained even when power is turned off. The non-volatile memory may be located within the wireless device or in the removable module.

Figure 2:
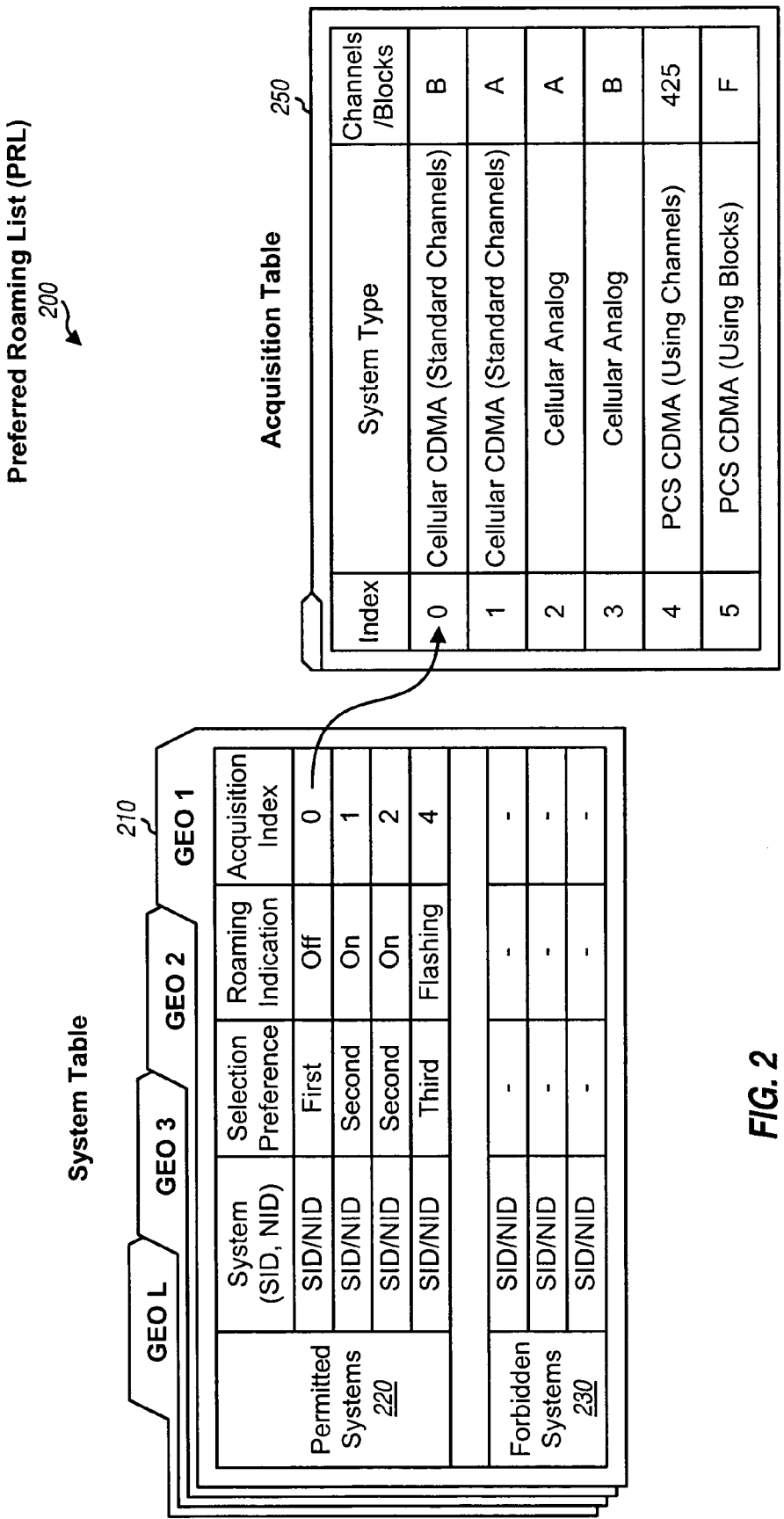
FIG. 2 shows a PRL structure used by IS-683-A and IS-683-C.

FIG. 2 graphically shows a PRL 200 having the structure used by IS-683-A and IS-683-C. PRL 200 includes a system table 210 and an acquisition table 250. System table 210 includes a list of permitted and forbidden systems/networks, which is organized by geographic areas (GEOs). For clarity, FIG. 2 shows each geographic area being represented by a respective tabbed table. Each tabbed table includes a section 220 for preferred systems/networks that the wireless device should access and a section 230 for forbidden systems/networks that the wireless device should not access.

The system table and acquisition table have different formats for 1x and 1xEV-DO. FIG. 2 shows the PRL format used for 1x. The tabbed table for each geographic area includes (1) one or more records for one or more systems/networks in the geographic area and (2) multiple fields for pertinent information for each record. These fields include system fields, a selection preference field, a roaming indicator field, and an acquisition index field. For each record, the system fields store the (SID, NID) pair assigned to the system/network associated with that record. The selection preference field indicates the preference for the associated system/network among all of the permitted systems/networks within the same geographic area. The network operator typically specifies the preference. The roaming indication field specifies how a roaming indicator on the wireless device should be displayed when receiving a signal from the associated system/network. The acquisition index field stores an index value that points to a specific record in acquisition table 250 containing the parameters to use to acquire the associated system/network. Acquisition table 250 includes one record for each unique index value. Each acquisition record includes multiple fields for various parameters used for system acquisition. The acquisition records for different types of system have different formats.

FIG. 2 shows a graphical representation of a PRL used for 1x. A PRL used for 1xEV-DO has a different format, as described below. For both 1x and 1xEV-DO, the PRL information is typically stored as a file.

Figure 3:
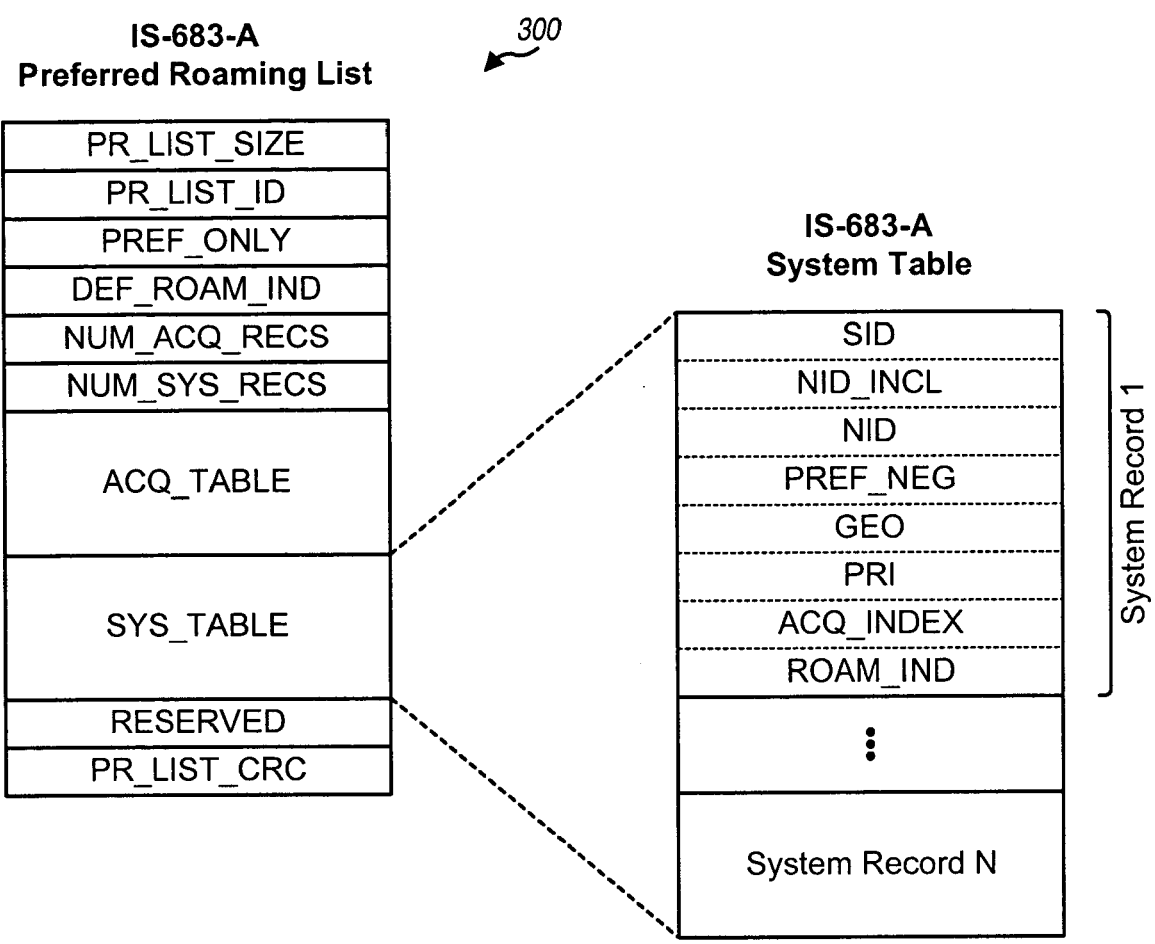
FIG. 3 shows a file containing a PRL defined by IS-683-A.

FIG. 3 shows a file 300 containing a PRL in the format defined by IS-683-A. The PRL contains a number of fields, all of which are shown in FIG. 3. A PR_LIST_SIZE field indicates the total size of the PRL (in octets or bytes). A NUM_ACQ_RECS field indicates the number of records in the acquisition table (i.e., acquisition records). A NUM_SYS_RECS field indicates the number of records in the system table (i.e., system records). An ACQ_TABLE field contains all of the records for the acquisition table. A SYS_TABLE field contains all of the records for the system table. A PR_LIST_CRC field carries a 16-bit CRC value that is calculated for all fields of the PRL except for the PR_LIST_CRC field. The other fields of the PRL are described in the IS-683-A document.

FIG. 3 also shows the format of a system record, as defined by IS-683-A. A SID field contains the SID value for the system associated with the record. A NID_INCL field indicates whether the record includes a NID. A NID field (if present) contains the NID value for the network associated with the record. An ACQ_INDEX field contains an index for an acquisition record containing acquisition parameters for the associated system. The other fields of the system record are described in the IS-683-A document.

IS-683-C defines two PRL formats—a PRL format and an extended PRL format. The PRL format in IS-683-C is similar to the PRL format in IS-683-A and may be used to convey PRL information for 1x systems. The extended PRL format in IS-683-C is different from the PRL format in IS-683-A and may be used to convey PRL information for both 1x and 1xEV-DO systems.

Figure 4:
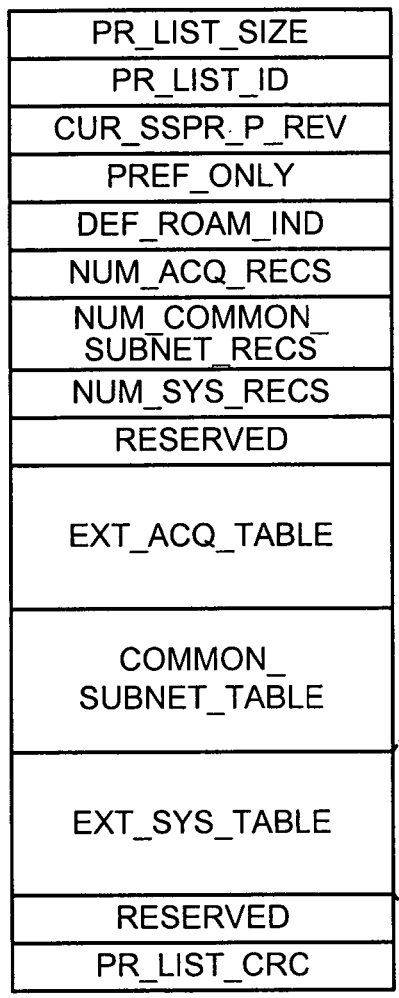
FIG. 4 shows a file containing an extended PRL defined by IS-683-C.
Figure 4:
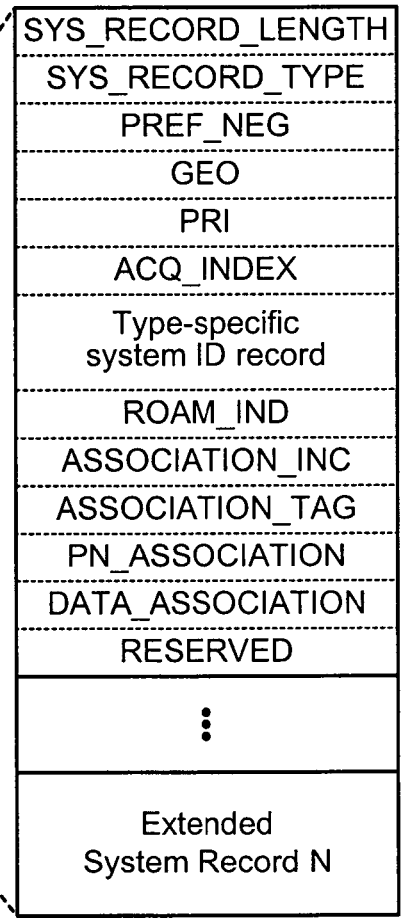

FIG. 4 shows a file 400 containing an extended PRL in the format defined by IS-683-C. The extended PRL contains a number of fields, all of which are shown in FIG. 4. A PR_LIST_SIZE field indicates the total size of the extended PRL. A CUR_SSPR_P_REV field indicates the protocol revision of a System Selection for Preferred Roaming (SSPR) download procedure that determines the parsing rules for the PRL. A NUM_ACQ_RECS field indicates the number of records in an extended acquisition table (i.e., extended acquisition records). A NUM_SYS_RECS field indicates the number of records in an extended system table (i.e., extended system records). A NUM_COMMON_SUBNET_RECS field indicates the number of records in a common subnet table. This common subnet table contains common portions of subnet-IDs. PRL compression may be achieved by listing common subnet prefixes only once in the common subnet table instead of many times in the system table. An EXT_ACQ_TABLE field contains all of the records for the extended acquisition table. A COMMON_SUBNET_TABLE field contains all of the records for the common subnet table. An EXT_SYS_TABLE field contains all of the records for the extended system table. A PR_LIST_CRC field carries a 16-bit CRC value that is calculated for all fields of the extended PRL except for the PR_LIST_CRC field. The other fields of the extended PRL are described in the IS-683-C document.

FIG. 4 also shows the format of an extended system record, as defined by IS-683-C. A SYS_RECORD_LENGTH field indicates the length of the extended system record. A SYS_RECORD_TYPE field indicates whether the record is for 1x or 1xEV-DO. A type-specific system ID record contains information that is specific for the system type indicated by the SYS_RECORD_TYPE field. For example, the system ID record contains SID and NID information for 1x and subnet information for 1xEV-DO. An ASSOCIATION_INC field indicates whether the system record contains an association tag. An ASSOCIATION_TAG field (if present) contains the association tag. Multiple systems within a given geographic area may be associated together and assigned an association tag that is unique for that geographic area. For example, 1x systems and 1xEV-DO systems within the same geographic area may be associated together. A wireless device may attempt to acquire a 1x system when first powered on, then determine a 1xEV-DO system associated with the acquired 1x system, and then attempt to acquire the associated 1xEV-DO system. The association allows the wireless device to more quickly acquire the 1xEV-DO system based on the 1x system. The other fields of the extended system record are described in the IS-683-C document.

As shown in FIGS. 3 and 4, the PRL format defined by IS-683-A is different from the extended PRL format defined by IS-683-C. A legacy wireless device designed to support IS-683-A can recognize and use a PRL given in the format shown in FIG. 3. This legacy wireless device would not be able to recognize an extended PRL given in the format shown in FIG. 4. A new wireless device designed to support IS-683-C can recognize and use the extended PRL shown in FIG. 4. This new wireless device would also be able to recognize and use the PRL shown in FIG. 3. The new wireless device can ascertain whether a given PRL is in the PRL format defined by IS-683-A or the extended PRL format defined by IS-683-C in several manners. If the PRL is received via an over-the-air (OTA) message, then the OTA message informs the wireless device the format of the PRL. The wireless device may also attempt to validate the PRL at power-up under IS-683A and IS-683C formats. In any case, the new wireless device when using a PRL given in the IS-683-A format would not be able to receive services from 1xEV-DO systems since this PRL does not support 1xEV-DO.

FIG. 5A shows a file 510 having a structure that can support both legacy and new wireless devices. File 510 includes a first PRL 512 followed by a second PRL 514. The first PRL is in an IS-683-A compatible format, which is a PRL format that can be used by wireless devices supporting IS-683-A. IS-683-A compatible formats include the PRL format defined by IS-683-A, the PRL format defined by IS-683-C, and PRL formats in later versions of IS-683 that are backward compatible with IS-683-A. The second PRL is in an IS-683-C compatible format, which is a PRL format that can be used by wireless devices supporting IS-683-C. IS-683-C compatible formats include IS-683-A compatible formats, the extended PRL format defined by IS-683-C, and PRL formats in later versions of IS-683 that are backward compatible with IS-683-C. For the embodiment shown in FIG. 5A, the first PRL contains PRL information for 1x systems, and the second PRL contains PRL information for both 1x and 1xEV-DO systems. Each PRL includes a PR_LIST_CRC field containing a CRC value used to validate that PRL. Although not shown in FIG. 5A, another CRC value may be generated for all of the PRLs stored in the file and this CRC value may be appended at the end of the file.

A legacy wireless device that is provided with file 510 would examine the PR_LIST_SIZE field in the first PRL to determine the size of this PRL. The legacy wireless device would then read all of the subsequent fields in the first PRL based on the first PRL size. The legacy wireless device would then compute a CRC value based on all applicable fields of the first PRL, compare the computed CRC value against the CRC value stored in the PR_LIST_CRC field of the first PRL, and use the first PRL if the computed CRC value matches the stored CRC value. The legacy wireless device would ignore the remaining data in the file. The second PRL in the file does not impair or impact the performance of the legacy wireless device because the legacy device ignores any information that may follow the first PRL.

A new wireless device that is provided with file 510 would examine the PR_LIST_SIZE field in the first PRL to determine the size of this PRL and may then jump to the second PRL. The new wireless device would then examine the PR_LIST_SIZE field in the second PRL to determine the size of this PRL. The new wireless device would next read all of the subsequent fields in the second PRL, compute a CRC value for all applicable fields of the second PRL, and compare the computed CRC value against the CRC value stored in the PR_LIST_CRC field of the second PRL. The new wireless device would use the second PRL if the computed CRC value matches the stored CRC value and would ignore the first PRL. In this case, the first PRL in the file does not impair or impact the performance of the new wireless device. The new wireless device would read, process, and use the first PRL if the computed CRC value for the second PRL does not match the stored CRC value, which indicates that the second PRL is corrupted or is not included in the file.

When more than one PRL is present, several rules may be used to determine which PRL to use for communication. For example, the PRL may be selected based on the order in which the PRLs are stored in the file, e.g., the last PRL in file may be selected for use. As another example, the highest PRL version may be selected for use. The PRL may also be selected in other manners.

FIG. 5A shows an embodiment whereby the second PRL contains PRL information for both 1x and 1xEV-DO systems. This embodiment simplifies processing to retrieve PRL information for 1x and 1xEV-DO systems since the new wireless device only needs to read the second PRL from the file and can ignore the first PRL. However, the file would likely contain redundant information since the PRL information for 1x systems in the second PRL may be similar to the PRL information for 1x systems in the first PRL.

FIG. 5B shows a file 520 that can also support both legacy and new wireless devices. File 520 includes a first PRL 522 followed by a second PRL 524. For the embodiment shown in FIG. 5B, the first PRL is in an IS-683-A compatible format and contains PRL information for 1x systems, and the second PRL is in an IS-683-C compatible format and contains PRL information for 1xEV-DO systems.

A legacy wireless device that is provided with file 520 would process this file and recover the first PRL in the file, e.g., as described above for FIG. 5A. The legacy wireless device would use the first PRL in file 520 and ignore the remaining data in the file. A new wireless device that is provided with file 520 would process this file and recover the second PRL in the file, e.g., as described above for FIG. 5A. The new wireless device would recognize that the second PRL contains PRL information for only 1xEV-DO systems and would recover the first PRL from the file. The new wireless device would then combine the PRL information for 1x systems in the first PRL with the PRL information for 1xEV-DO systems in the second PRL to generate a combined PRL suitable for use for both 1x and 1xEV-DO systems.

The new wireless device may also associate 1x systems in the first PRL with 1xEV-DO systems in the second PRL. In one embodiment, each 1xEV-DO system in the second PRL is associated with all 1x systems in the first PRL. This loose association can reduce the size of the PRL since the DO systems are listed once.

In another embodiment, 1xEV-DO systems are associated with 1x systems based on geographic area (GEO). For this embodiment, the geographic areas in the second PRL are matched with the geographic areas in the first PRL. Each 1xEV-DO system in the second PRL is associated with all 1x systems in the same geographic area in the first PRL. Geographic area is a virtual concept in IS-683 and is explicitly divided by a 1-bit on-off flag. One way to associate geographic areas in the 1x and 1xEV-DO systems is to have geographic areas in both the first and second PRLs include a common record. This common record may include (1) a real SID/NID pair for a 1x system or (2) a specially selected SID and a dedicated NID for a virtual system. The second PRL may then include some 1x or 1x-like entries. The geographic areas in the first and second PRLs with the same 1x or 1x-like record are associated together.

In yet another embodiment, the records in the second PRL are associated with the records in the first PRL based on their order in the tables. For example, the first extended system record in the second PRL is associated with the first system record in the first PRL, the second extended system record is associated with the second system record, and so on. For this embodiment, dummy records may be inserted in the first and/or second PRLs to facilitate the association. Alternatively, the ASSO_TAG field of the second PRL may be redefined and used as an index that points to an associated record in the first PRL. Since the ASSO_TAG field is an 8-bit field, the index can point to records 0 through 255 in the first PRL. The index that is stored in the ASSO_TAG field may also point to a geographic area (instead of a record) in the first PRL, or may point to a combination of a geographic area and a record in the first field. For example, the first bit of the 8-bit ASSO_TAG field may indicate whether the following 7-bit value is an index for a record or an index for a geographic area.

In yet another embodiment, 1xEV-DO systems are associated with 1x systems based on information broadcast by 1x systems. A base station in a 1x system may broadcast information to indicate whether there is a 1xEV-DO system that overlaps the 1x system. The association between 1x and 1xEV-DO systems may then be made based on the information broadcast by 1x systems. In any case, the association between 1x systems and 1xEV-DO systems can facilitate system selection and acquisition, as described above for the ASSOCIATION_TAG field.

In general, the second PRL may be a "complete" PRL or a "partial" PRL. A complete PRL is a PRL that is suitable for use by itself, without having to be combined with another PRL. A partial PRL is a PRL that is to be combined with another PRL. The second PRL may be a complete PRL if, e.g., it contains PRL information for both 1x and 1xEV-DO systems, as shown in FIG. 5A. The second PRL may be a partial PRL if, e.g., it contains PRL information for only 1xEV-DO systems, as shown in FIG. 5B. The second PRL may also be a partial PRL if it contains some of the 1x systems, e.g., only 1x systems associated with 1xEV-DO systems. A partial PRL may be fairly comprehensive and contain PRL information for any number of 1xEV-DO systems. A partial PRL may also be sparse and contain few records. For example, a partial PRL may contain a single acquisition record for a band class and RF channels used by a network operator and a single system record with a wildcard, which means that any system may be used. In any case, a partial PRL may be combined with another PRL (e.g., the first PRL) to obtain a more comprehensive PRL for more systems.

File 520 can typically carry all of the PRL information in file 510 using fewer bits. A smaller file size is desirable if storage space for the file is limited. This may be the case, e.g., if the file is to be stored in a removable module. A smaller file size is also desirable for over-the-air transmission.

Figure 5C:
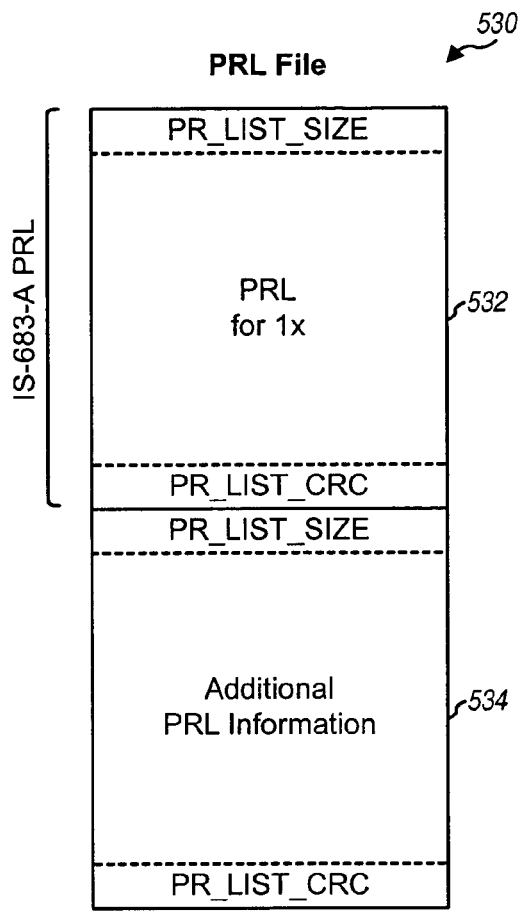

FIG. 5C shows a file 530 that includes a first PRL 532 followed by a section 534 with additional PRL information. For the embodiment shown in FIG. 5C, the first PRL is in an IS-683-A compatible format and contains PRL information for 1x systems. The additional PRL information may be in any format that is recognizable by new wireless devices. The additional PRL information may be for 1x systems and/or 1xEV-DO systems. In an embodiment, the additional PRL information is for 1xEV-DO systems but is presented in a format that is more efficient than the extended PRL format in IS-683-C. In another embodiment, the additional PRL information is for feature enhancements, functionality extensions, and so on, which may not be supported by IS-683-A and/or IS-683-C. Some examples of such feature enhancements and functionality extensions include supports for GSM, GPRS, UMTS, WLAN, and other systems. In any case, the additional PRL information may be viewed as a second PRL that is in a proprietary PRL format not defined by IS-683-A or IS-683-C.

Legacy wireless devices can process file 530 to recover the first PRL and would ignore the remaining data in the file. New wireless devices can process file 530 to recover the first PRL as well as the additional PRL information. The new wireless devices would then combine the additional PRL information with the first PRL to generate a combined PRL for use for system selection and acquisition.

FIGS. 5A through 5C show a file structure that can support two types of wireless devices. The same concept may be extended to support any number of wireless device types.

Figure 5D:
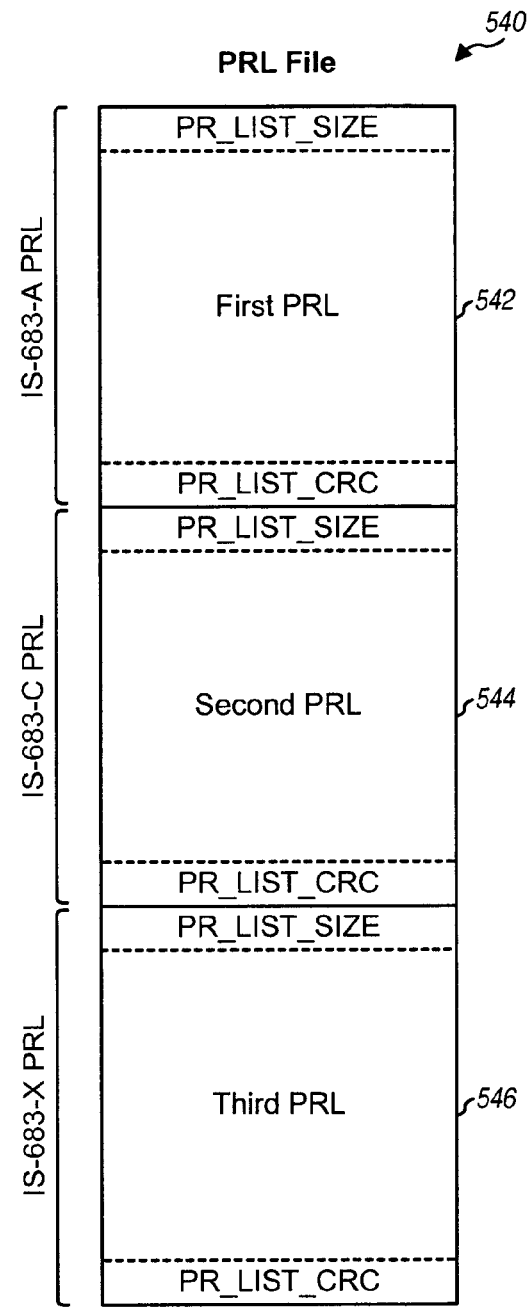

FIG. 5D shows a file 540 that can support three different types of wireless devices. File 540 includes a first PRL 542, followed by a second PRL 544, and further followed by a third PRL 546. The first PRL may be in an IS-683-A compatible format, and the second PRL may be in an IS-683-C compatible format. The third PRL may be in a new PRL format defined by a later version of IS-683, which is labeled as IS-683-X in FIG. 5D.

Legacy wireless devices supporting IS-683-A can process file 540 to recover the first PRL and would ignore the remaining data in the file. New wireless devices supporting IS-683-C can process file 540 to (1) recover only the second PRL, if this PRL contains PRL information for both 1x and 1xEV-DO systems, or (2) recover and combine the first and second PRLs to generate the combined PRL, if the second PRL is a partial PRL. Future wireless devices supporting IS-683-X can process file 540 to recover the first, second, and/or third PRL. Depending on the contents of these three PRLs, the future wireless devices may (1) use the third PRL by itself, if it is a complete PRL, or (2) combine the third PRL with the first and/or second PRL to generate a combined PRL, if the third PRL is a partial PRL.

Figures 5E, 5F:
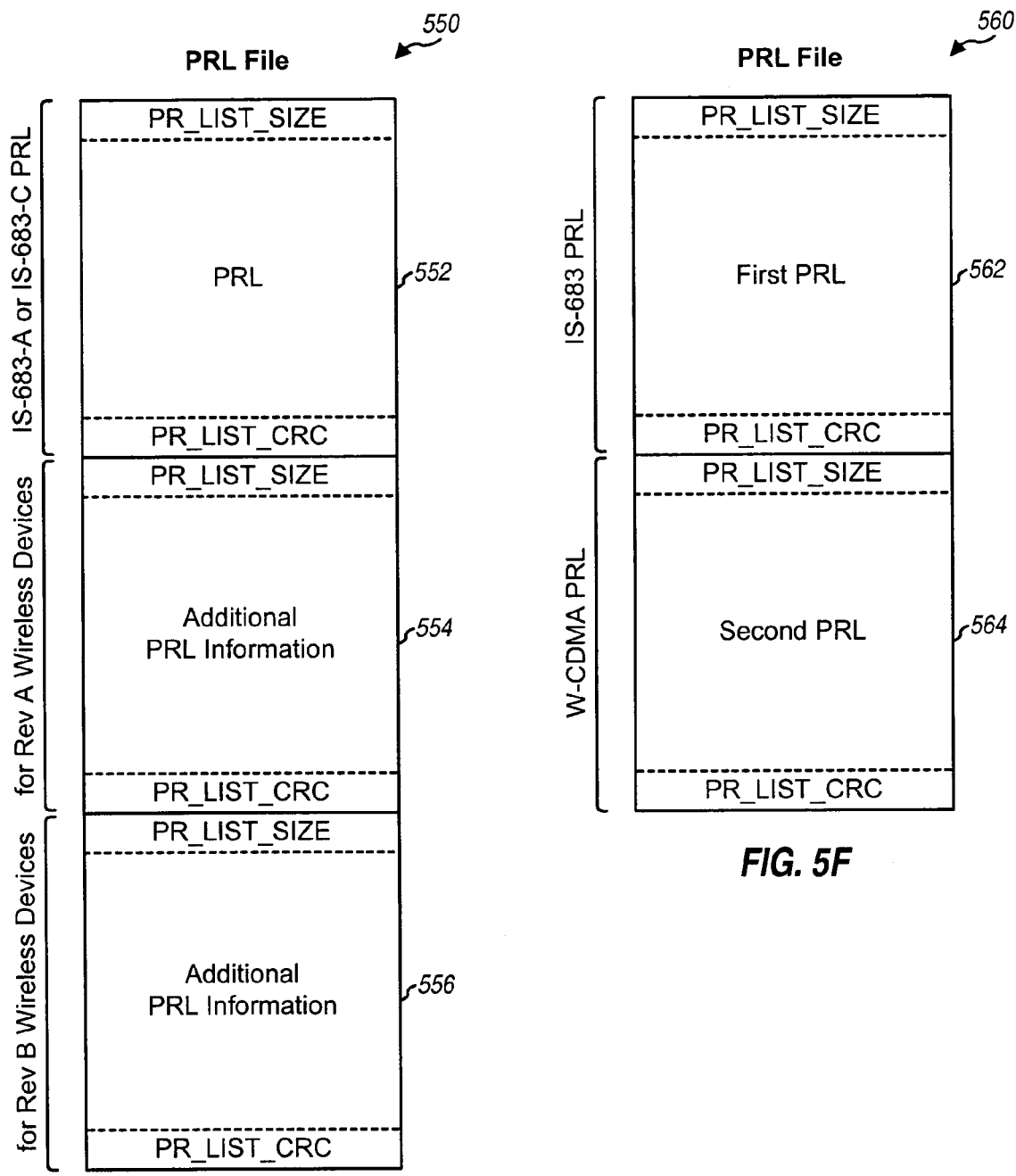

FIG. 5E shows a file 550 that includes a first PRL 552, followed by a section 554 with additional PRL information, and further followed by a section 556 with more PRL information. The first PRL may be in an IS-683-A compatible format, an IS-683-C compatible format, or some other PRL format. The additional PRL information in section 554 may be intended for wireless devices of revision A (Rev A). The additional PRL information in section 556 may be intended for wireless devices of revision B (Rev B). Revisions A and B may simply denote two different types of wireless devices. For example, Rev A and Rev B wireless devices may both support IS-683-A but may be released at different times and have different capabilities. The additional PRL information in sections 554 and 556 may be for additional systems, feature enhancements, functionality extensions, and so on, or any combination thereof. The additional PRL information in sections 554 and 556 may also be viewed as second and third PRLs that are in PRL formats not defined by IS-683-A or IS-683-C.

The first PRL in file 550 may be intended for legacy and/or new wireless devices. Rev A wireless devices are able to recover the additional PRL information in section 554 and may combine this PRL information with the first PRL to generate a combined PRL. Rev B wireless devices are further able to recover the additional PRL information in section 556 and may combine this PRL information with the first PRL and possibly the additional PRL information in section 554 to generate a combined PRL.

FIG. 5F shows a file 560 that includes a first PRL 562 followed by a second PRL 564. The first PRL may be in an IS-683-A format, an IS-683-C format, or some other PRL format used for cdma2000. The second PRL may be in a format used for W-CDMA. A wireless device supporting cdma2000 can recover and use the first PRL. A multi-RAT wireless device supporting both cdma2000 and W-CDMA can also recover and use the second PRL. In general, any combination of RATs may be supported by the PRL file described herein.

FIGS. 5A through 5F show six different PRL files that may be used to support wireless devices of different capabilities. Other PRL files may also be formed based on the description provided herein. In general, a PRL file may contain any number of PRLs, any number of sections, and any type of PRL information.

A new wireless device may be presented with a PRL file that may contain (1) one PRL in the format defined by IS-683-A, as shown in FIG. 3, (2) one extended PRL in the format defined by IS-683-C, as shown in FIG. 4, (3) an IS-683-A compatible PRL followed by an IS-683-C compatible PRL, as shown in FIG. 5A, (4) an IS-683-A compatible PRL followed by a partial PRL, as shown in FIG. 5B, (5) an IS-683-A compatible PRL followed by additional PRL information, as shown in FIG. 5C, and so on. The new wireless device may be designed to retrieve and use all of the pertinent PRL information contained in the file.

Figure 6:
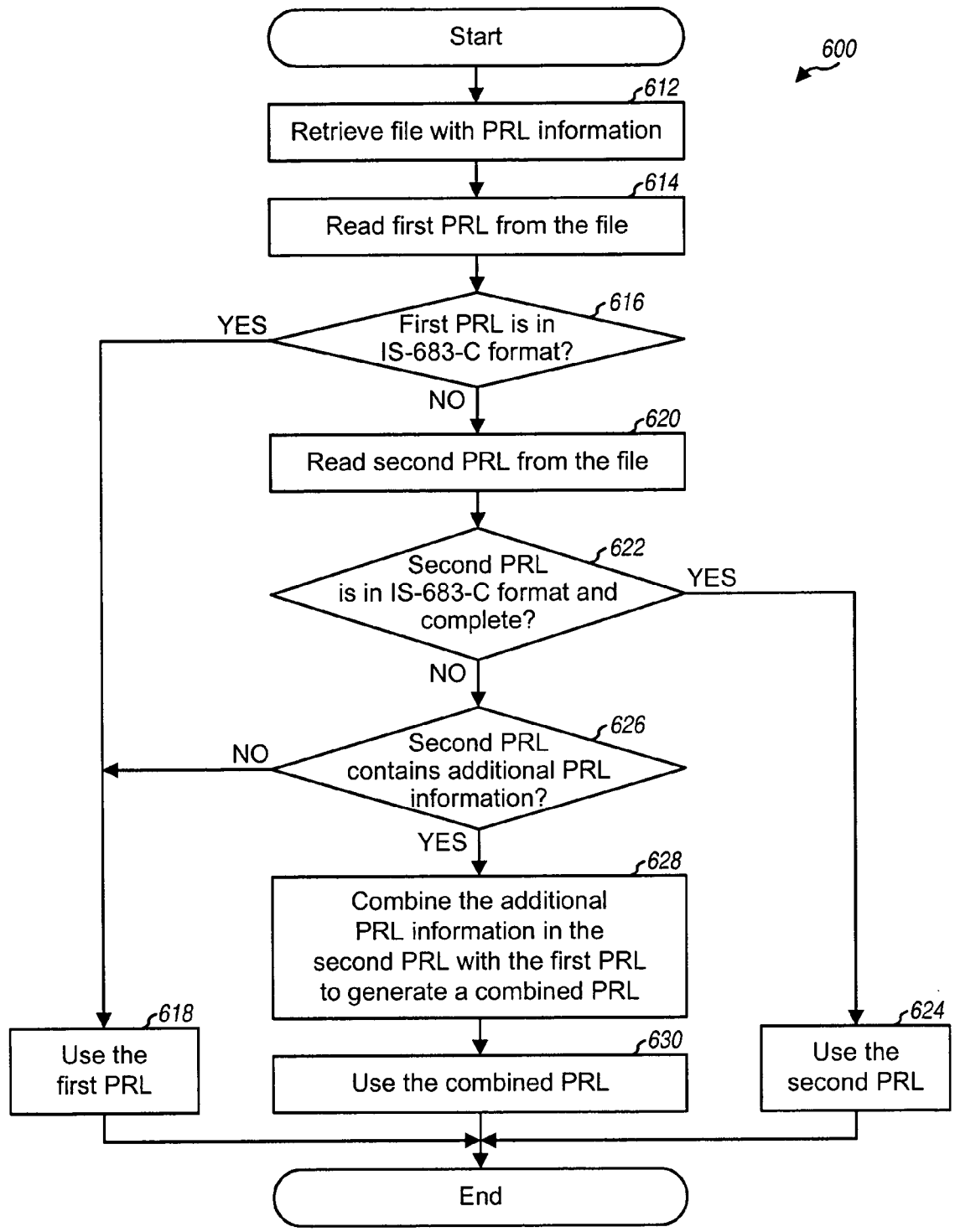
FIGS. 6 and 7 show processes performed by a wireless device to obtain a PRL from a file with two PRLs and from a file with any number of PRLs, respectively.

FIG. 6 shows a flow diagram of a process 600 performed by a new wireless device to obtain a PRL used for system selection and acquisition. The device initially retrieves a file containing PRL information, e.g., from a non-volatile memory within the device or a removable module (block 612). The device reads the first PRL from the file based on the PR_LIST_SIZE field for the first PRL (block 614). The device then determines whether the first PRL is in the IS-683-C format (block 616). If the answer is 'Yes', then the device uses the first PRL without processing the rest of the file (block 618). Otherwise, the device reads the second PRL from the file based on the PR_LIST_SIZE field for the second PRL (block 620).

The device then determines whether the second PRL is in the IS-683-C format and is complete (block 622). The second PRL may be deemed to be complete, for example, (1) if the second PRL contains system records for both 1x and 1xEV-DO systems, (2) if the second PRL is present in the file, regardless of its content, (3) if a designated field in the second PRL contains a value to indicate that this PRL is complete, or (4) based on some other criteria. In any case, if the answer is 'Yes' for block 622, then the device uses the second PRL (block 624). Otherwise, the device determines whether the second PRL contains additional PRL information (block 626). The answer for block 626 may be 'No' if the file contains only one PRL or if the second PRL contains an error. In this case, the device uses the first PRL. Otherwise, if the second PRL contains additional PRL information, then the device combines the additional PRL information with the first PRL to generate a combined PRL (block 628). The device may also combine PRL information resident on the device or obtained in some other manner to generate the combined PRL. The device then uses this combined PRL (block 630).

Figure 7:
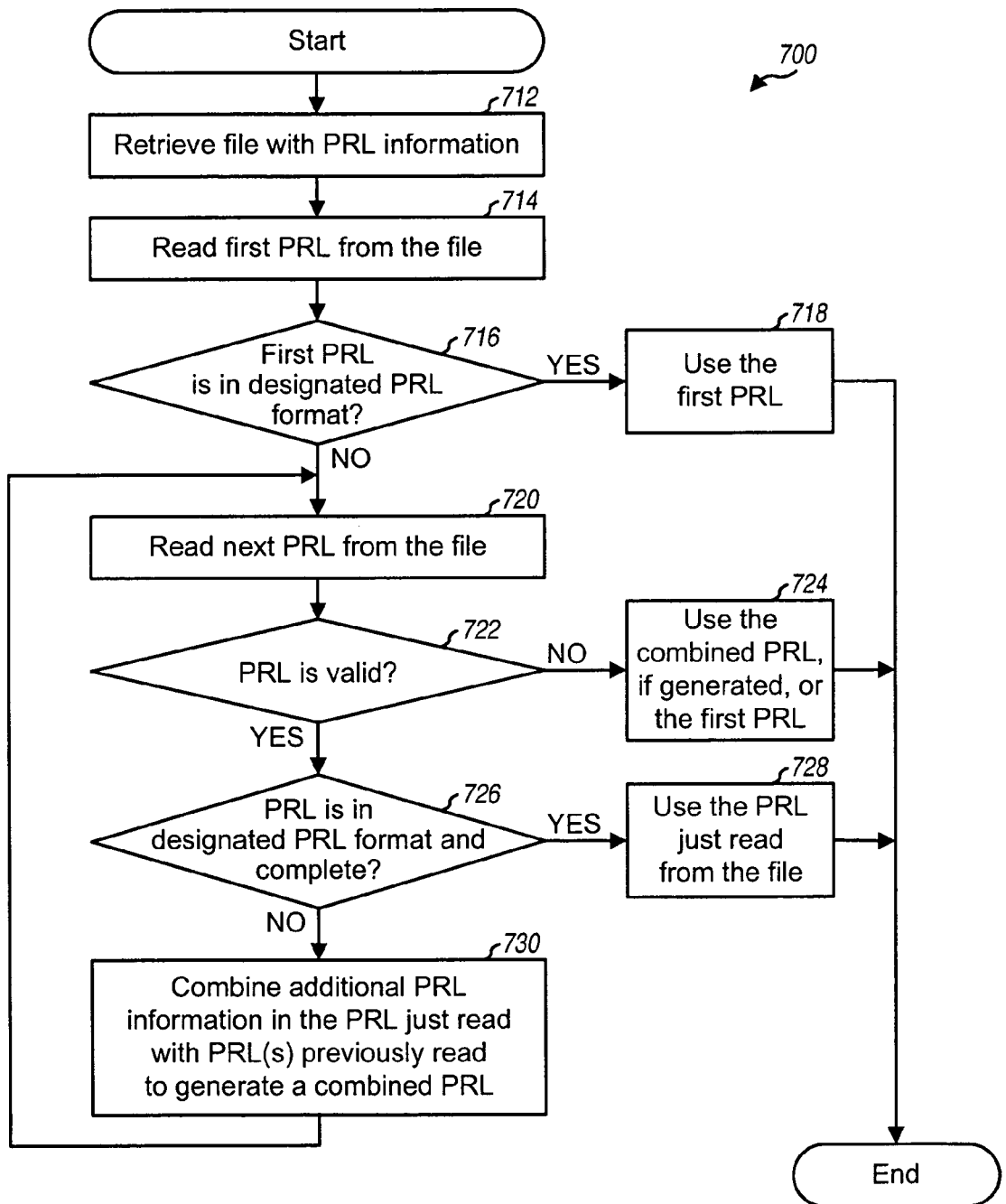

FIG. 7 shows a flow diagram of a process 700 performed by a wireless device to process a file containing any number of PRLs. The device initially retrieves the file (block 712). The device reads the first PRL from the file (block 714) and determines whether this PRL is in a designated PRL format, e.g., an IS-683-C compatible format (block 716). If the answer is 'Yes', then the device uses the first PRL without processing the rest of the file (block 718). Otherwise, the device reads the next PRL from the file (block 720) and determines whether this PRL is valid (block 722). If the answer is 'No', which indicates that all PRLs in the file have been read, then the device uses the combined PRL (if one was generated) or the first PRL (if the file contains only one valid PRL) (block 724).

Otherwise, if the PRL just read from the file is valid, then the device determines whether this PRL is in the designated PRL format and is complete (block 726). If the answer is 'Yes', then the device uses this PRL (block 728). Otherwise, the device combines the PRL information in this PRL with all of the PRLs (if any) previously read from the file, as appropriate, to generate a combined PRL (block 730). The device then returns to block 720 to read the next PRL from the file.

FIG. 6 shows a process that is applicable for a file with two PRLs and for IS-683-C. FIG. 7 shows a process that is applicable for a file with any number of PRLs and any standard. Other processes may also be implemented, and this is within the scope of the invention.

A single PRL file that can support wireless devices of different capabilities may be advantageously stored in a removable module such as an R-UIM card. The same removable module may be inserted in different wireless devices with different capabilities. The same PRL file can support all of these different wireless devices.

Figures 8, 9:
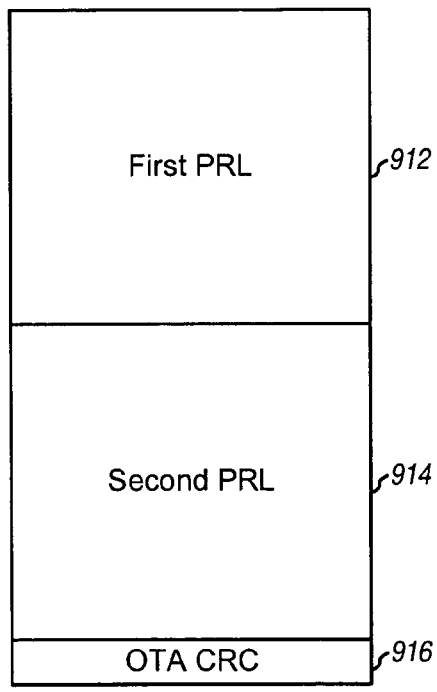
FIG. 8 shows an elementary file for storing a PRL in a removable module.
FIG. 9 shows a PRL data block used for over-the-air programming.

FIG. 8 shows an $EF_{PRL}$ elementary file 800 used to store a PRL in a removable module. The $EF_{PRL}$ elementary file includes a header followed by the PRL. In the header, an Identifier field contains a value of "6F30" to identify this elementary file as an $EF_{PRL}$ elementary file. A File size field indicates the size of the PRL file being stored in the elementary file. Typically, only one PRL is stored in the $EF_{PRL}$ elementary file, and the value in the PR_LIST_SIZE field of this PRL is copied to the File size field of the elementary file. To store a PRL file with multiple PRLs in the $EF_{PRL}$ elementary file, the File size field is set to the size of the entire PRL file, and not to the value in the PR_LIST_SIZE field of the first PRL. The other fields in the header of the elementary file are set in the normal manner. The entire PRL file is stored in the body of the $EF_{PRL}$ elementary file, as shown in FIG. 8. The various fields of the $EF_{PRL}$ elementary file are described in a document TIA/ELA/IS-820, entitled "Removable User Identity Module (R-UIM) for TIA/EIA Spread Spectrum Standards," May 2000, and in a document TIA/ELA/IS-820-1, entitled "Removable User Identity Module (R-UIM) for TIA/EIA Spread Spectrum Standards Addendum 1," June 2001, both of which are publicly available.

The $EF_{PRL}$ elementary file can store the entire PRL file as if this PRL file is a single PRL, as shown in FIG. 8. The elementary file does not need to be aware of the different structure being used for the PRL file. When a wireless device accesses the removable module to retrieve the PRL file in the elementary file, an entity responsible for reading the removable module typically checks the File size field to determine the size of the PRL stored in the $EF_{PRL}$ elementary file, retrieves the entire PRL without checking its content, and provides the PRL to the wireless device. This entity also does not need to be informed of the different structure being used for the PRL file stored in the elementary file.

Many deployed R-UIM cards do not support 1xEV-DO. It is desirable to upgrade these R-UIM cards to support 1xEV-DO, so that deployments of new R-UIM cards for the sole purpose of supporting 1xEV-DO can be avoided. The deployed R-UIM cards may be upgraded using over-the-air programming.

FIG. 9 shows a data block 900 that may be sent over-the-air (OTA) to wireless devices. Data block 900 includes a first PRL 912, a second PRL 914, and an OTA CRC 916. The first PRL may be in an IS-683-A compatible format and may contain PRL information for 1x systems. The second PRL may be in an IS-683-C compatible format or some other format and may be (1) a complete PRL, e.g., with PRL information for both 1x and 1xEV-DO systems, or (2) a partial PRL, e.g., with PRL information for 1xEV-DO systems and possibly some 1x systems associated with these 1xEV-DO systems. In general, the data block may include any number of PRLs of any format. The OTA CRC is calculated over the entire data block and in accordance with the applicable standard (e.g., IS-683-C). The OTA CRC is used by a recipient of the data block to determine whether the data block was received correctly (in which case the PRL information in the data block may be stored in non-volatile memory) or in error (in which case the data block is rejected). The data block is typically sent in a higher layer message. The data block size is indicated by a header field in the message, and the OTA CRC is carried in another field in the message. A wireless device can ascertain the data block size based on the message header and determine whether the data block is received correctly or in error based on the OTA CRC.

The data block may be sent over-the-air in several manners. In one embodiment, the data block is sent using an Over-the-Air Service Provisioning Function (OTAF) described in 3GPP2 N.S0011-0, entitled "OTASP and OTAPA". For this embodiment, an OTAF entity forms the data block and encapsulates the data block in one or more *OTASP Data Messages*, as described in IS-683-C. In another embodiment, the data block is sent using Short Message Service (SMS). For this embodiment, a PRL server forms the data block and sends the data block to an SMS service center, which then encapsulates the data block in one or more SMS messages. SMS is described in a document TIA/EIA-637-B, entitled "Short Message Service for Wideband Spread Spectrum Systems," January 2002, which is publicly available. The PRL may also be sent using IP-based Over The Air (IOTA) provisioning described in 3GPP2 C.S0040, entitled "IP Based Over-the-Air Handset Configuration Management (IOTA-HCM)," Jul. 18, 2003.

The PRL file described herein can provide backward and forward compatibility for wireless devices with different capabilities. This single PRL file may be stored on a removable module that may be used for both legacy and new wireless devices. This single PRL file may also be sent over-the-air to both legacy and new wireless devices. This can simplify management of PRLs by a network operator since a single PRL file can be used for different wireless devices that would normally require different files containing different PRLs.

The file structure described herein may also be used for other types of data besides PRL. For example, the file structure may be used for a CDMA service table, service preferences, short messages, SMS parameters, and so on. The CDMA service table indicates which services are allocated and whether the allocated services are activated. A wireless device only selects services that are allocated and activated. A file may include multiple CDMA service tables in different formats that are recognizable and usable by wireless devices with different capabilities. The files for other types of data may also have multiple sections for wireless devices with different capabilities.

Figure 10:
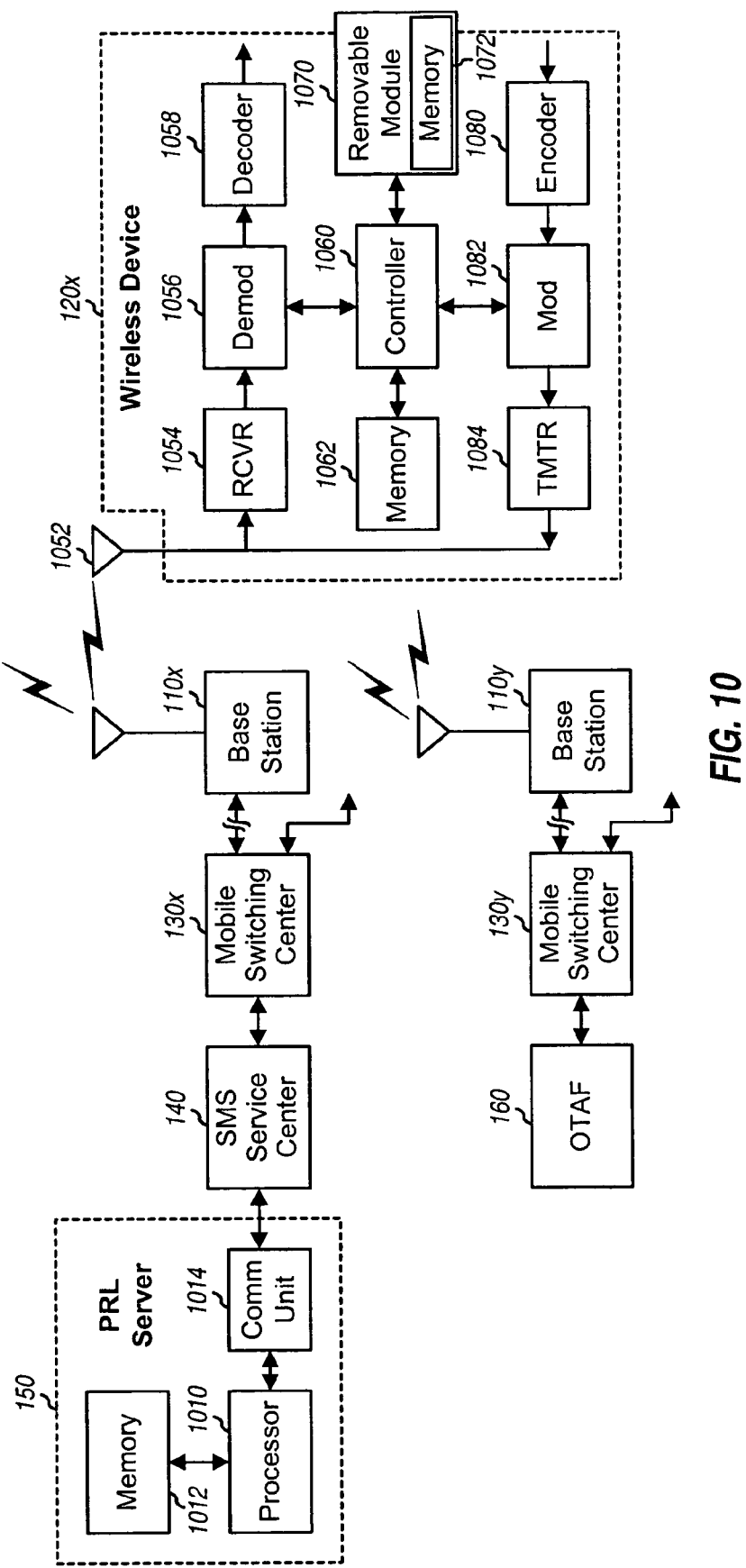
FIG. 10 shows a block diagram of a wireless device.

FIG. 10 shows a block diagram of an embodiment of wireless device 120x and various network entities. At wireless device 120x, an antenna 1052 receives signals transmitted by various base stations (e.g., base stations 110x and/or 110y) and provides a received signal. A receiver unit (RCVR) 1054 conditions (e.g., filters, amplifies, and frequency downconverts) the received signal, digitizes the conditioned signal, and provides data samples. A demodulator (Demod) 1056 demodulates the data samples and provides demodulated data. A decoder 1058 decodes the demodulated data and provides decoded data. The demodulation and decoding are based on, e.g., 1x or 1xEV-DO physical layer processing. For data transmission, an encoder 1080 encodes data and messages to be transmitted by wireless device 120x, and a modulator (Mod) 1082 modulates the encoded data. A transmitter unit (TMTR) 1084 conditions (e.g., filters, amplifies, and frequency upconverts) the modulated data and generates a modulated signal, which is transmitted via antenna 1052.

A controller 1060 directs the operation of various processing units within wireless device 120x. Controller 1060 further performs process 600 in FIG. 6 or process 700 in FIG. 7 to obtain a PRL for use by wireless device 120x for system selection and acquisition. Memory unit 1062 stores program codes and data used by controller 1060. A removable module 1070 includes a non-volatile memory unit 1072 that can store various types of data. For example, removable module 1070 may store an elementary file containing a PRL file having the structure described above, subscription information for a user, and so on. Removable module 1070 makes it easier for the user to roam among CDMA networks, and between networks of different RATs, and also allows the user to use the same removable module on different wireless devices. Removable module 1070 may be an R-UIM (used for cdma2000), a Subscriber Identity Module (SIM) (used for W-CDMA and GSM), a Universal Subscriber Identity Module (USIM) (also used for W-CDMA and GSM), and so on.

A PRL server 150 supports over-the-air programming of PRL using SMS messages. Within PRL server 150, a processor 1010 receives multiple PRLs from a memory unit 1012 and generates a data block with these PRLs. A communication unit 1014 forwards the data block to an SMS service center 140, which encapsulates the data block within one or more SMS messages. An MSC 130x receives the SMS messages and forwards the messages via a base station controller (BSC) (not shown in FIG. 10) to base station 110x, which then transmits the messages over-the-air to the wireless devices within its coverage area. An OTAF 160 also supports over-the-air programming of PRL. OTAF 160 may generate a data block with multiple PRLs and encapsulates the data block in one or more messages. An MSC 130y receives the message(s) from OTAF 160 and forwards the message(s) via a BSC (not shown in FIG. 10) to base station 110y for transmission to the wireless devices. At wireless device 120x, controller 1060 receives a decoded data block with one or more PRLs and stores the PRL information, e.g., as an $EF_{PRL}$ elementary file in removable module 1070. The concatenated PRL may also be stored in a non-volatile memory at wireless device 120x.

The techniques described herein may be implemented by various means. For example, these techniques may be implemented in hardware, software, or a combination thereof. For a hardware implementation, the processing units used for system selection and acquisition at a wireless device may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to support over-the-air programming of PRL at a network entity may also be implemented within one or more ASICs, DSPs, controllers, and so on.

For a software implementation, the techniques may be implemented with modules (e.g., procedures, functions, and so on) that perform the functions described herein. The software codes may be stored in a memory unit (e.g., memory unit 1012 or 1062 in FIG. 10) and executed by a processor (e.g., processor 1010 or controller 1060). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless apparatus comprising:
   a memory unit operative to store a file containing preferred roaming list (PRL) information; and
   a controller operative to
      obtain a first PRL from the file,
      obtain a second PRL from the file if the second PRL is available, determine whether the first PRL is in a designated PRL format, and wherein the first PRL is used for system selection and acquisition if the first PRL is in the designated PRL format;
      determine whether the second PRL is in the designated PRL format, and wherein the second PRL is used for system selection and acquisition if the second PRL is in the designated PRL format; and
      combine the first and second PRLs to generate a combined PRL if the first PRL is not in the designated PRL format and the second PRL is not complete, and wherein the combined PRL is used for system selection and acquisition if generated.

2. The wireless apparatus of claim 1, wherein the controller is operative to ascertain an order in which the first and second PRLs are stored in the file and to use the first PRL, the second PRL, or both the first and second PRLs based on the order of the first and second PRLs in the file.

3. The wireless apparatus of claim 1, wherein the controller is further operable to perform validation to determine whether the second PRL is available from the file.

4. The wireless apparatus of claim 1, wherein the controller is further operative to receive the file via over-the-air programming and to store the file in the memory unit.

5. The wireless apparatus of claim 1, wherein the controller is further operative to receive the file via a serial bus and to store the file in the memory unit.

6. The wireless apparatus of claim 1, wherein the first PRL includes PRL information for at least one wireless communication network, and wherein the second PRL includes PRL information for at least one other wireless communication network not covered by the first PRL.

7. The wireless apparatus of claim 1, wherein the first PRL includes PRL information for a 1x CDMA network, and wherein the second PRL includes PRL information for the 1x CDMA network and a 1xEV-DO CDMA network.

8. The wireless apparatus of claim 1, wherein the first PRL includes PRL information for a 1x CDMA network, and wherein the second PRL includes PRL information for a 1xEV-DO CDMA network.

9. The wireless apparatus of claim 1, wherein the first PRL is for a first radio access technology (RAT), and wherein the second PRL is for a second RAT.

10. A method of performing system selection and acquisition, comprising:
- obtaining a first preferred roaming list (PRL) from a file containing PRL information;
- obtaining a second PRL from the file if the second PRL is available;
- determining whether the first PRL is in a designated PRL format, and wherein the first PRL is used for system selection and acquisition if the first PRL is in the designated PRL format;
- determining whether the second PRL is in the designated PRL format, and wherein the second PRL is used for system selection and acquisition if the second PRL is in designated PRL format; and
- combining the first and second PRLs to generate a combined PRL if the first PRL is not in the designated PRL format and the second PRL is not complete, and wherein the combined PRL is used for system selection and acquisition if generated.

11. The method of claim 10, further comprising:
- determining whether the second PRL is valid, and wherein the first PRL is used for system selection and acquisition if the second PRL is not valid.

12. The method of claim 10, wherein each of the first and second PRLs includes a PRL size field used to retrieve the PRL and a cyclic redundancy check (CRC) field used to check validity of the PRL.

13. The method of claim 10, further comprising:
- receiving the file via over-the-air programming; and
- storing the file in a non-volatile memory.

14. A wireless apparatus comprising:
- means for obtaining a first preferred roaming list (PRL) from a file containing PRL information;
- means for obtaining a second PRL from the file if the second PRL is available;
- means for determining whether the first PRL is in a designated PRL format, and wherein the first PRL is used for system selection and acquisition if the first PRL is in the designated PRL format;
- means for determining whether the second PRL is in the designated PRL format, and wherein the second PRL is used for system selection and acquisition if the second PRL is in designated PRL format; and
- means for combining the first and second PRLs to generate a combined PRL if the first PRL is not in the designated PRL format and the second PRL is not complete, and wherein the combined PRL is used for system selection and acquisition if generated.

15. A processor readable media for storing instructions operable in a wireless device to:
- obtain a first preferred roaming list (PRL) from a file containing PRL information;
- obtain a second PRL from the file if the second PRL is available;
- determine whether the first PRL is in a designated PRL format, and wherein the first PRL is used for system selection and acquisition if the first PRL format, and wherein the second determine whether the first PRL is in the designated PRL format, and wherein the second PRL is used for system selection and acquisition if the second PRL is in the designated PRL format; and
- combine the first and second PRLs to generate a combined PRL if the first PRL is not in the designated PRL format and the second PRL is not complete, and wherein the combined PRL is used for selection and acquisition if generated.

16. A method of performing system selection and acquisition, comprising:
- obtaining a first preferred roaming list (PRL) from a file containing PRL information;
- determining whether the first PRL is in a designated PRL format; and
- using the first PRL for system selection and acquisition if the first PRL is in the designated PRL format,
- if the first PRL is not in the designated PRL format,
  - obtaining a second PRL from the file if the second PRL is available,
  - determining whether the second PRL is in the designated PRL format, and
  - using the second PRL for system selection and acquisition if the second PRL is in the designated PRL format,
- if the second PRL is not in the designated PRL format or is not complete,
  - combining the first and second PRLs to generate a combined PRL, and
  - using the combined PRL for system selection and acquisition.

17. The method of claim 16, further comprising:
- if the second PRL is not valid, using the first PRL for system selection and acquisition.

* * * * *